United States Patent [19]

Shigemura et al.

[11] Patent Number: 4,519,702

[45] Date of Patent: May 28, 1985

[54] APPARATUS FOR REGULATING THE MOVEMENT OF A MOVABLE MEMBER

[75] Inventors: Yutaka Shigemura, Hyogo; Hiroshi Kimura, Osaka; Masahiko Hisajima, Osaka; Shinobu Satonaka, Osaka; Seiji Kaminaga, Chiba; Mitsuya Ishito, Osaka, all of Japan

[73] Assignee: Mita Industrial Company Limited, Osaka, Japan

[21] Appl. No.: 544,057

[22] Filed: Oct. 21, 1983

[30] Foreign Application Priority Data

Nov. 30, 1982 [JP] Japan .................. 57-210290

[51] Int. Cl.³ .................. G03B 27/48; G03B 27/50; G03B 27/70
[52] U.S. Cl. .......................... 355/51; 355/8; 355/11; 355/57
[58] Field of Search .................. 355/8, 11, 51, 57

[56] References Cited

U.S. PATENT DOCUMENTS

| 4,159,173 | 6/1979 | Kasuga | 355/8 |
| 4,183,656 | 1/1980 | Ishihara et al. | 355/8 |
| 4,183,660 | 1/1980 | Bujese | 355/8 X |
| 4,256,399 | 5/1981 | Ikeda | 355/8 |
| 4,383,753 | 5/1983 | Inuzuka et al. | 355/8 |
| 4,421,402 | 12/1983 | Komori et al. | 355/8 |
| 4,473,287 | 9/1984 | Fukuhara et al. | 354/409 X |
| 4,477,164 | 10/1984 | Nakai et al. | 354/286 |

Primary Examiner—Richard A. Wintercorn
Attorney, Agent, or Firm—Wenderoth, Lind & Ponack

[57] ABSTRACT

An apparatus for regulating the movement of a movable member includes a drive device for moving the movable member in a first direction from a rest position to an operative position and for moving the movable member in a second direction, opposite to the first direction, from the operative position toward the rest position. A first detector detects the presence of the movable member at the rest position. A second detector detects the presence of the movable member at a location adjacent the rest position but upstream thereof with respect to the second direction. A control arrangement is operatively connected to the drive device and to the first and second detectors to operate the drive device to move the movable member in the first direction and then in the second direction, to stop the drive device upon detection of the movable member moving in the second direction at the location by the second detector, whereafter the movable member continues movement by inertia in the second direction from such location to the rest position and is detected thereat by the first detector, and too, if the movable member is not detected at the rest position by the first detector within a predetermined time period after the detection by the second detector, again starting the drive device to move the movable member in the second direction until detection thereof by the first detector.

5 Claims, 9 Drawing Figures

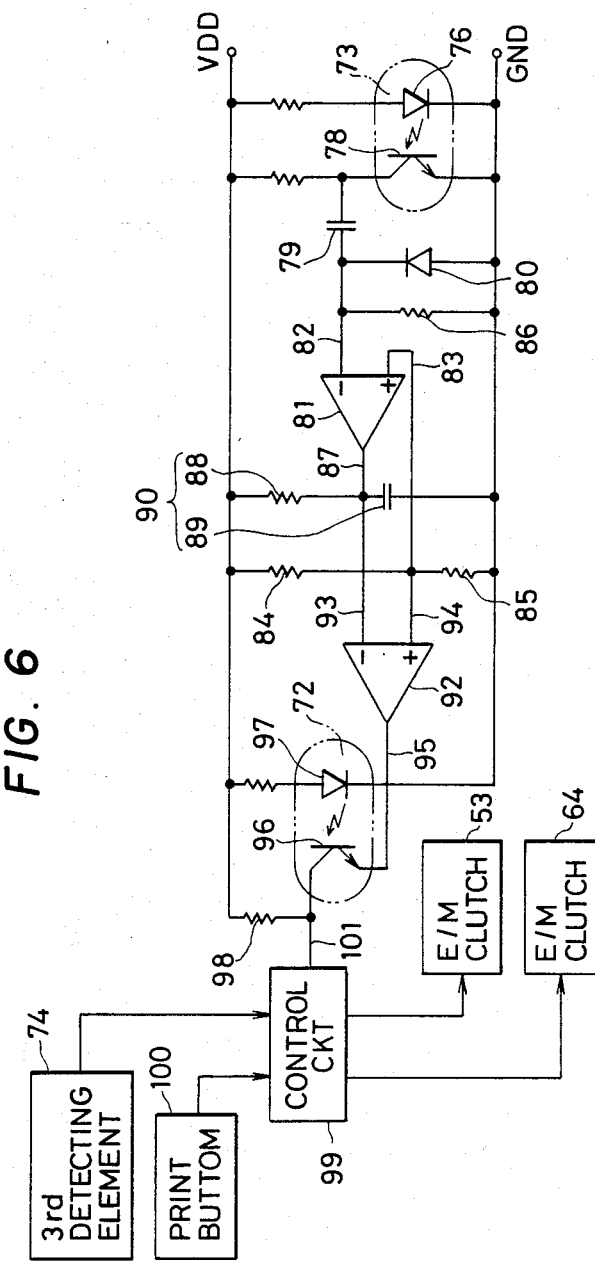
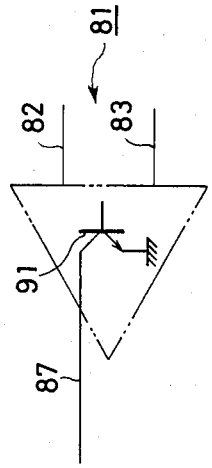
FIG. 6
FIG. 7

4,519,702

APPARATUS FOR REGULATING THE MOVEMENT OF A MOVABLE MEMBER

BACKGROUND OF THE INVENTION

The present invention is directed to an apparatus for regulating the movement of a movable member, particularly a portion of an electrostatic copying machine which is moved to expose an original which is to be copied onto a sheet of copy paper.

In electrostatic copying machines, it is known to move, during exposure of an original, either a platen supporting the original and the original, or an exposing unit. It is desirable that the driving assembly for achieving such movement relatively gently stops the movable member after the exposure operation, since otherwise shocks are imparted to the movable member, thus causing blurring of the resultant image and/or shaking of the copying machine.

SUMMARY OF THE INVENTION

Accordingly, it is an object of the present invention to provide an apparatus for regulating the movement of a movable member and for ensuring that the movable member is stopped relatively gently, thereby avoiding the occurrence of shocks imparted to the movable member.

It is a further object of the present invention to provide such an apparatus for regulating the movement of a portion of an electrostatic copying machine which is moved during an exposure of an original, whereby it is possible to avoid shock to the movable portion, thereby avoiding blurring of the image of the original.

These objects are achieved in accordance with the present invention by the provision of an apparatus including drive means for moving the movable member in a first direction from a rest position to an operative position and for moving the movable member in a second direction, opposite to the first direction, from the operative position toward the rest position, first detecting means for detecting the presence of the movable member at the rest position, and second detecting means for detecting the presence of the movable member at a location adjacent the rest position but upstream thereof with respect to the second direction. Control means is operatively connected to the drive means and to the first and second detecting means for operating the drive means to move the movable member in the first direction and then in the second direction, for stopping the drive means upon detection of the movable member, moving in the second direction, at the location by the second detecting means, whereafter the movable member continues to move by inertia in the second direction from the location to the rest position and is detected thereat by the first detecting means, and for, if the movable member is not detected at the rest position by the first detecting means within a predetermined time period after the detection by the second detecting means, again starting the drive means to move the movable member in the second direction until detection thereof by the first detecting means.

In accordance with the present invention, the drive means may include a first drive assembly for driving the movable member in the first direction, and a second drive assembly for driving the movable member in the second direction, the control means being operatively connected to the first and second drive assemblies. In accordance with a specific adaptation of the present invention, the movable member includes a movable portion of an electrostatic copying machine, such as the exposing unit thereof or the original supporting platen and the original, which is moved in the first direction during exposure of the original, and the apparatus of the invention further includes a third detecting means, positioned downstream of the second detecting means with respect to the first direction and operatively connected to the control means, for detecting the movement of the movable portion for commencing feeding of a copy paper sheet.

The detecting means may each include a light emitting element and a light receiving element, and the apparatus may further include a light shield member mounted for movement with the movable member between respective of the light emitting and receiving elements.

BRIEF DESCRIPTION OF THE DRAWINGS

Other objects, features and advantages of the present invention will be apparent from the following detailed description, taken with the accompanying drawings, wherein:

FIG. 6 is an electrical circuit diagram of control means embodying the present invention;

FIG. 7 is an enlarged circuit diagram illustrating a portion of the circuit of FIG. 6.

DETAILED DESCRIPTION OF THE INVENTION

The following detailed description will be with reference to regulating the movement of portions of an exposing unit of a transfer type electrostatic copying machine, during exposure of a stationary original to obtain copying of the image of the original.

Figure 1:
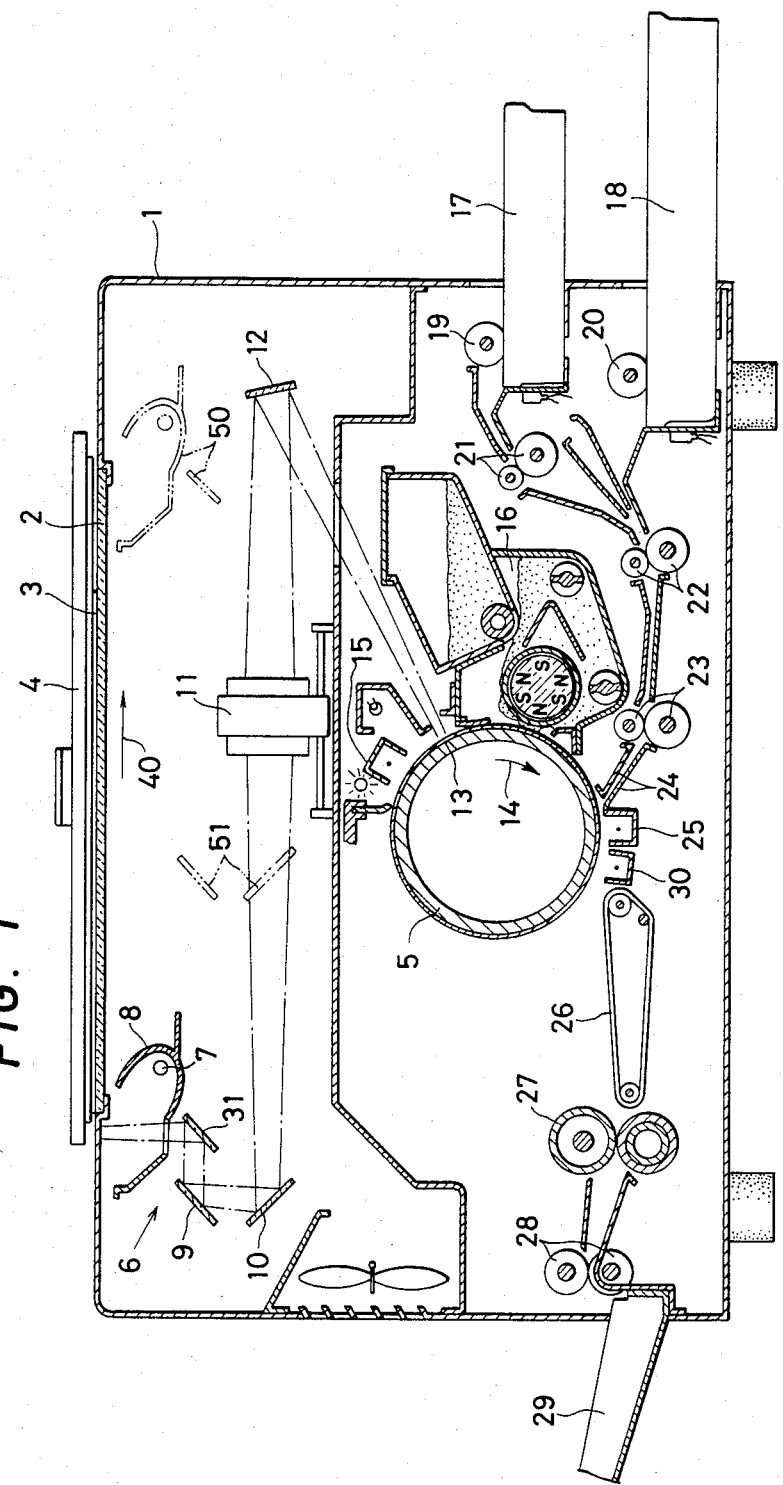
FIG. 1 is a longitudinal section view showing the structure of a transfer type electrostatic copying machine of the type to which the apparatus of the present invention is particularly applicable.

Thus, shown in FIG. 1 is a transfer type electrostatic copying machine including a copying machine body 1 having fixedly positioned at the top thereof a transparent plate 2 adapted to support an original 3 to be copied. A cover 4 presses the original 3 against transparent plate 2. The machine includes an exposing unit to form an image of the original 3 on a photosensitive member 5. Exposing unit 6 includes an exposing lamp 7 for illuminating original 3, a reflecting mirror 8 for applying light from the exposing lamp 7 to the original 3, reflecting mirrors 31, 9 and 10 for reflecting the image of the original, a condensor lens 11 and a reflecting mirror 12 for transmitting the image of the original to an exposure region 13 on the photosensitive member 5. A charging corona discharger 15 is provided adjacent the photosensitive member 5. A latent image formed at the exposure region 13 is developed into a toner image by a magnetic brush developing unit 16. Sheets of copying paper are conveyed selectively from supplies 17 and 18, such as cassettes, provided at one side of machine body 1 by means of supplying rollers 19 and 20 and pairs of conveying rollers 21, 22 and 23, and then are guided by guide means 24. The toner image is transferred from the surface of photosensitive member 5 onto a particular copy paper sheet by a transferring corona discharger 25. A discharging corona discharger 30 is provided adjacent the transferring corona discharger 25, and more specifically, is located downstream of photosensitive member 5 in the direction of rotation thereof, as indicated by arrow 14. The imaged copy paper sheet is peeled off from the photosensitive member 5 by corona discharger 30 and is conveyed by an endless conveying belt 26 to a fixing unit 27. The finished copy paper sheet is delivered onto a tray 29 provided on an opposite side of the copying machine body 1.

Figure 2:
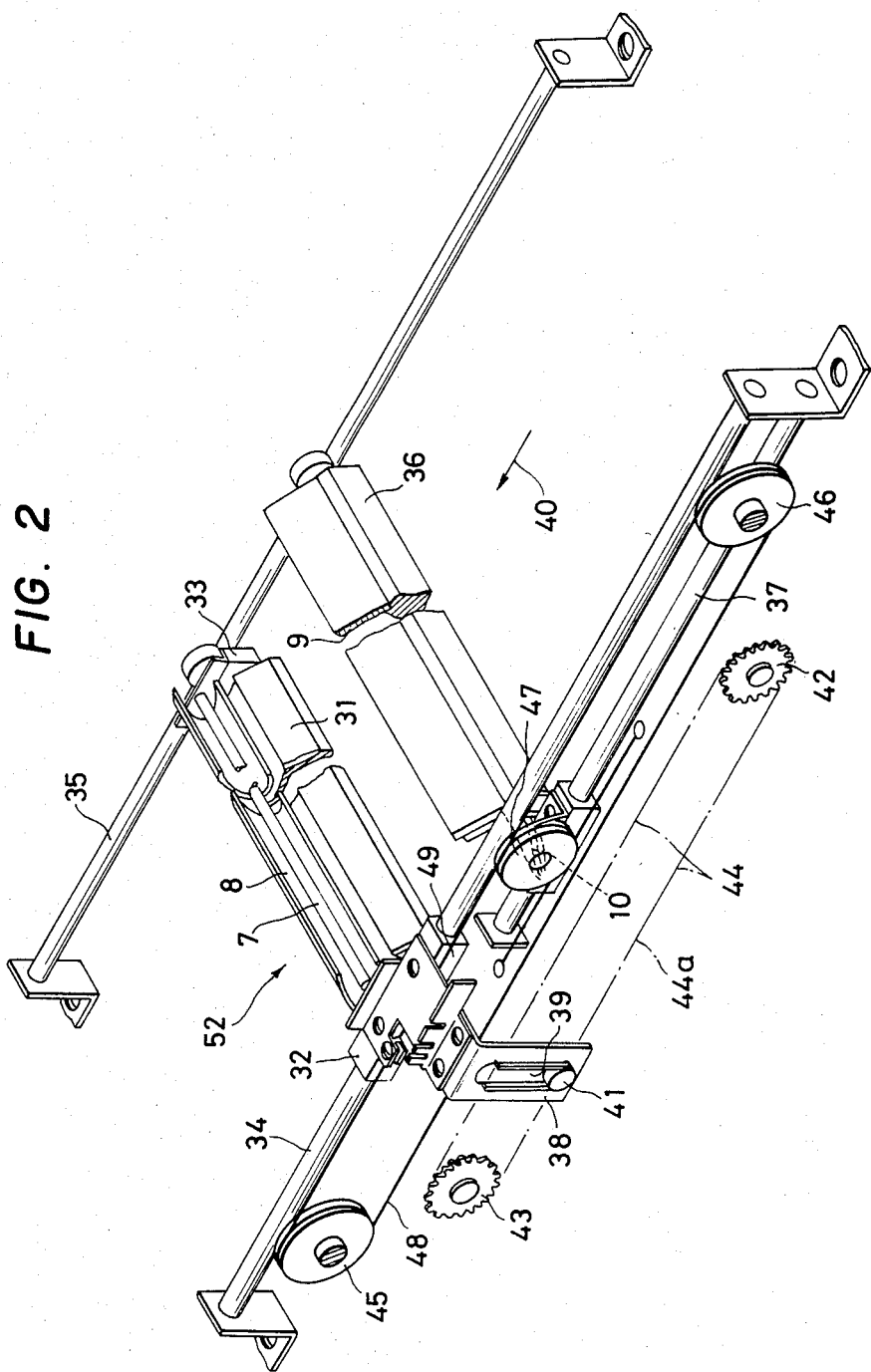
FIG. 2 is a perspective view of a drive structure of the apparatus of FIG. 1.

FIG. 2 is a perspective view of a drive means 52 included in the exposing unit 6 shown in FIG. 1. The exposing lamp 7 and reflecting mirrors 8, 31 are fixed to the supports 32, 33 and are movable horizontally in the direction of arrow 40 on guide bars 34, 35. Reflecting mirrors 9 and 10 are fixedly mounted on a support 36 which is movable horizontally in the direction of arrow 40 on guide bars 35, 37. A drive member 38 is fixedly secured to and extends downwardly from the support 32. A vertically extending elongated hole 39 is formed in drive member 38, and a drive protrusion 41 loosely fits into elongated hole 39. Drive protrusion 41 is fixedly connected to the lower half 44a of an endless chain 44 which extends horizontally around sprocket wheels 42, 43. Wires or cables 48, 49 extend around pulleys 45, 46 which are mounted rotatably on machine body 1 and around a pulley 47 which is rotatably mounted on support 36. Specifically, one end of cable 48 is connected to support 32, the cable is wound around pulleys 45, 46, 47, and the opposite end of such cable is connected to machine body 1. On the other hand, one end of cable 49 is connected to support 32, the cable then is wound around pulley 47, and the opposite end of the cable is connected to machine body 1. By this arrangement, reflecting mirrors 9, 10 are moved at a speed which is half of the speed of exposing lamp 7 and reflecting mirrors 8, 31. When the exposing lamp 7 and reflecting mirrors 8, 31 are at a rest position indicated by the solid lines in FIG. 1, the reflecting mirrors 9, 10 will be at the position indicated by the solid lines in FIG. 1. When the exposing lamp 7 and reflecting mirrors 8, 31 are moved to the rightmost position as viewed in FIG. 1, i.e. as indicated by dashed lines 50 in FIG. 1, at the end of an exposure operation, the reflecting mirrors 9, 10 will be at the position indicated by the dashed lines 51 in FIG. 1.

Figure 3:
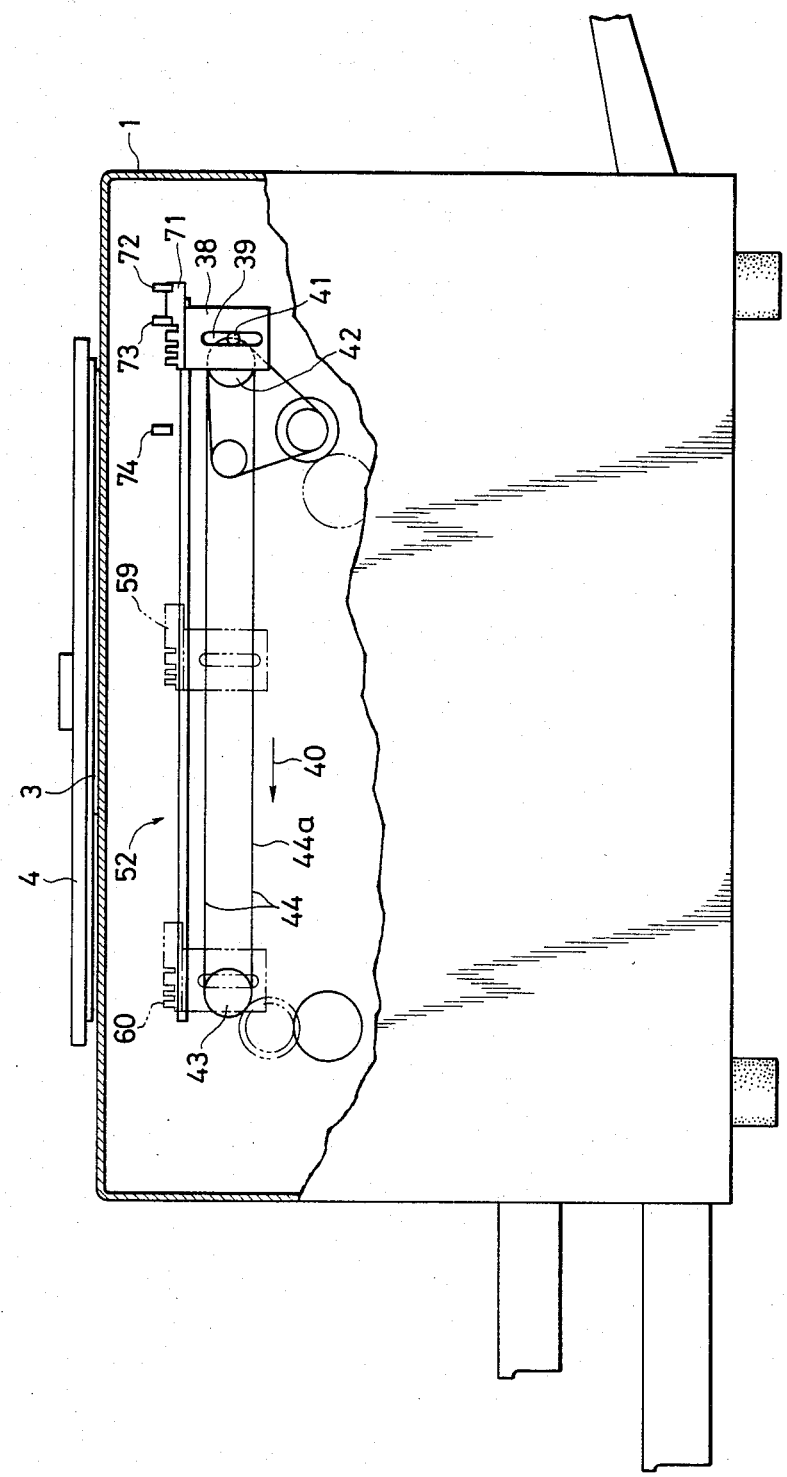
FIG. 3 is a simplified partial sectional view of part of the drive structure of FIG. 2 and including the apparatus of the present invention.
Figure 4:
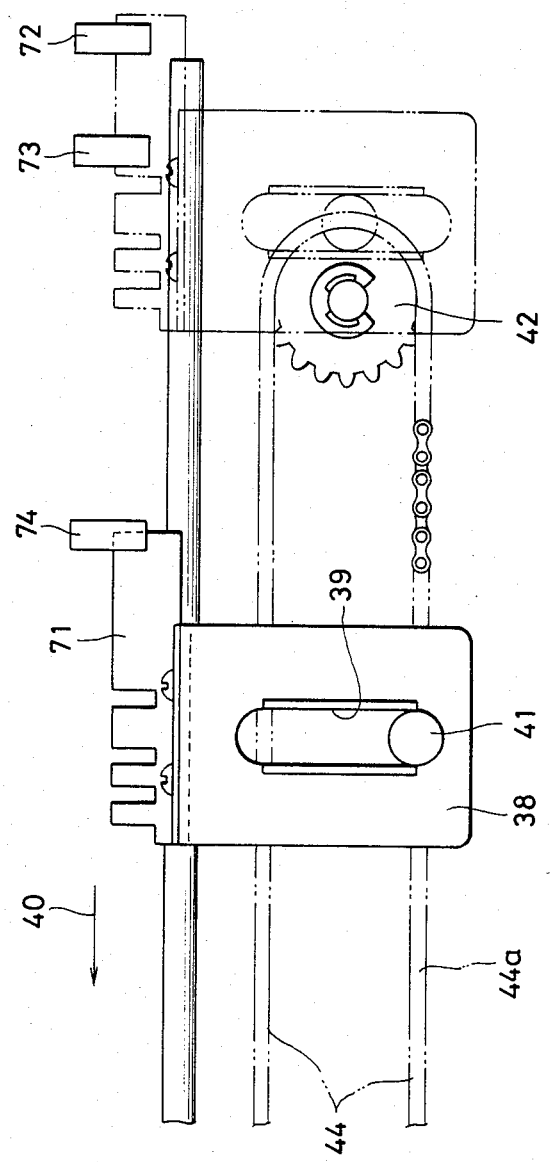
FIG. 4 is an enlarged partial view of the apparatus of the present invention.
Figure 5:
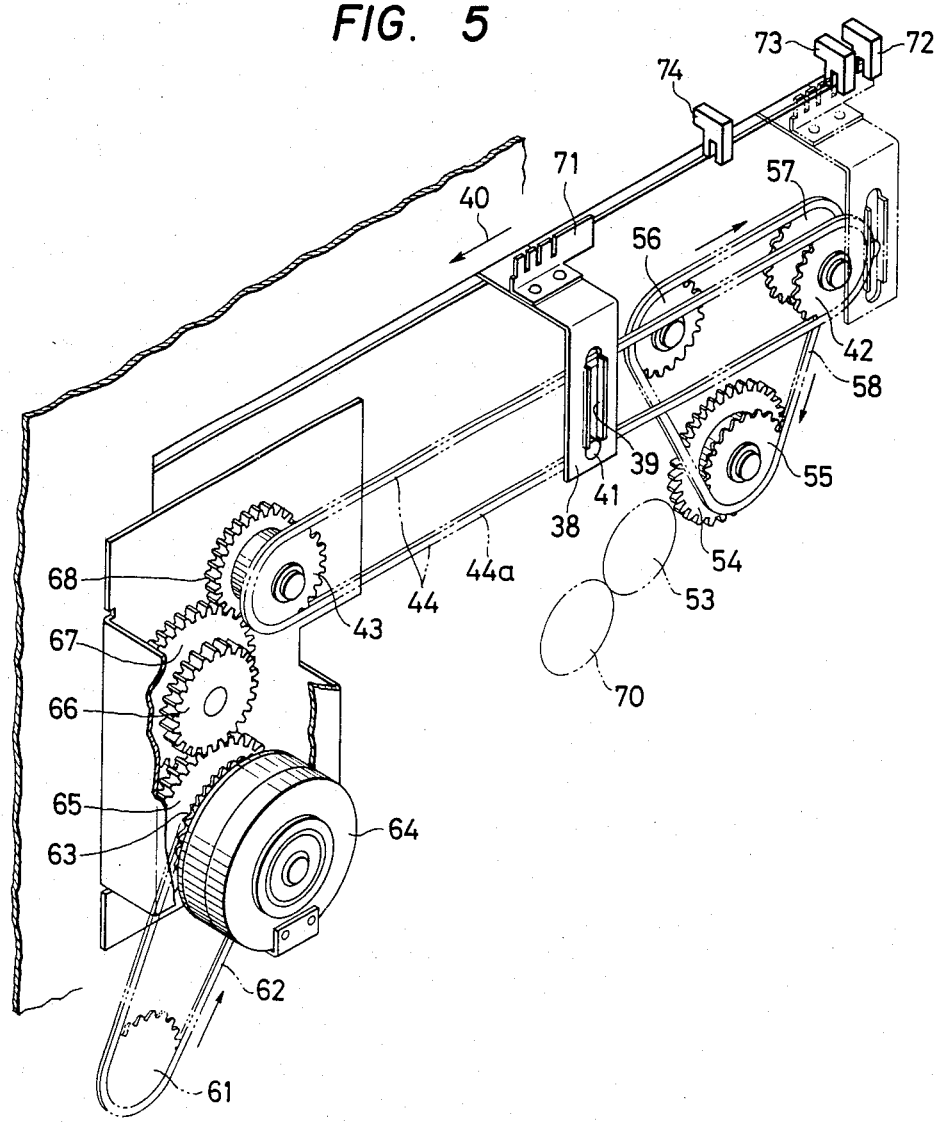
FIG. 5 is a perspective view of a specific structural arrangement of the apparatus of the present invention.

FIG. 3 is a simplified sectional view showing a portion of the drive device 52 for driving the exposing lamp 7 and reflecting mirrors 8, 31. FIG. 4 is an enlarged partial view of the righthand portion of the structure shown in FIG. 4. FIG. 5 is a perspective view of a detailed structural arrangement of the drive device. When the exposing lamp 7 and reflecting mirrors 8, 31, and thereby the drive member 38, are at the rest position indicated by the solid lines in FIG. 3 and the dashed lines in FIGS. 4 and 5, the drive protrusion 41 is located on that side of sprocket wheel 42 opposite to sprocket wheel 43. During an exposure operation, power from a drive source 70 is transmitted through an electromagnetic clutch 53 to a gear 54 and to a chain 58 extending around a sprocket 55 fixed coaxially to gear 54 and around additional sprocket wheels 56, 57. Such power thus is transmitted to sprocket wheel 42 which is coaxially secured to sprocket wheel 57. Drive protrusion 41 commences moving from a position on the periphery of sprocket wheel 42 which is furthest from sprocket wheel 43. Thus, with the chain 58 running at a constant speed, the speed of drive member 38 gradually increases while the drive protrusion passes along approximately one quarter of the circumference of sprocket wheel 42. In the case of an original 3 having a Japanese Industrial Standard size "A4", drive member 38 is moved to the position indicated by the dashed lines 59 in FIG. 3, and in the case of an original 3 having a Japanese Industrial Standard size "A3" which is longer than size "A4" in the direction of movement, drive member 38 is moved to the position indicated by the dashed lines 60 in FIG. 3. After the drive member 38 is moved to one of such positions, or to another predetermined position, chain 44 then is moved in the opposite direction, such that drive member 38 is moved in a direction opposite to that indicated by arrow 40, i.e. in a return direction. For this returning operation, electromagnetic clutch 53 is released, and the power from a drive source 61 is transmitted through a chain 62, a sprocket wheel 63, an electromagnetic clutch 64, and gears 65–68 to sprocket wheel 43 which is coaxially fixed to gear 68. When the power of drive source 70 is applied through electromagnetic clutch 53 to cause drive member 38 to be moved, then of course electromagnetic clutch 64 is released.

A light shield member 71 is fixedly installed on support 32 with drive member 38. First, second and third detecting elements 72, 73, 74, respectively, are provided to detect movement of light shield member 71 in the direction of arrow 40 and in the opposite direction. First detecting element 72 detects when light shield member 71, and thereby exposing lamp 7 and reflecting mirrors 8, 31, are at the rest position. Second detecting element 73 is provided at a position downstream of but adjacent to first detecting element 72, with respect to direction 40. Third detecting element 74 is provided downstream of second detecting element 73, with respect to the direction of arrow 40. Although various possible devices may be employed for the detecting elements, in the preferred embodiment of the present invention, the first, second and third detecting elements 72, 73, 74, respectively, each are formed of a light emitting element and a light receiving element in confronting relationship. A detection operation is carried out when light shield member 71 intercepts the light emitted from a particular emitting element such that the light is not received by the respective light receiving element. Third detecting element 74 is operable to detect the movement of light shield member 71 in the direction of arrow 40, that is during an exposure operation, at a particular instant to initiate the operation of supplying rollers 19/20 to supply a copy paper sheet from one of the cassettes 17, 18.

FIG. 6 is an electrical circuit diagram for first, second and third detecting elements 72, 73, 74, respectively, and the associated structural elements. With regard to second detecting element 73, light emitted by its light emitting element 76 is received by its light receiving element 78. The output of the light receiving 78 is differentiated by a differentiation capacitor 79. A diode 80 applies only a positive pulse from capacitor 79 to one input terminal 82 of a comparison circuit 81, the other input terminal 83 of comparison circuit 81 receiving a reference voltage for defining a discrimination level l which is provided by means of a voltage-dividing resistors 84, 85. Input terminal 82 is connected to a resistor 86. The output 87 of comparison circuit 81 is applied to a time constant circuit 90 formed of a resistor 88 and a capacitor 89.

FIG. 7 shows a simplified output side of comparison circuit 81. When the level of the signal at one input 82 exceeds the discrimination level l of the other input 83, an open collector type transistor 91 is rendered conductive and has a low level output.

The output of time constant circuit 90 is applied to one input terminal 93 of a second comparison circuit 92, the other input terminal 94 of which receives a reference voltage which is provided by means of voltage-dividing resistors 84, 85. Comparison circuit 92 is similar in arrangement to comparison circuit 81, and the output 95 of comparison circuit 92 is applied to the light receiving element 96 of first detecting element 72. In first detecting element 72, light emitted by its light emitting element 97 is received by light receiving element 96. The output of light receiving element 96 is clamped at a high level by a resistor 98. A control circuit 99 including a suitable microcomputer, as will be understood by those skilled in the art, receives signals from light receiving element 96, third detecting element 74, and a print button 100, thereby to control electromagnetic clutches 53, 64, the operation of which was discussed above.

Figure 8:
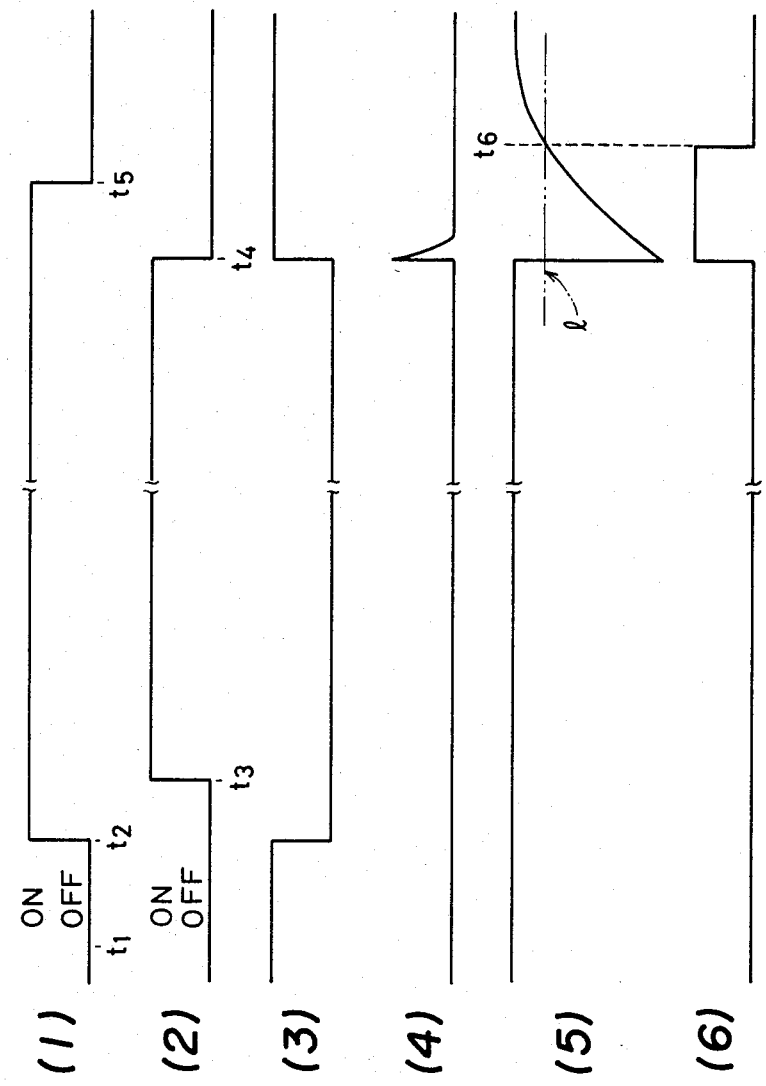
FIGS. 8 and 9 are graphs of wave forms occurring at various portions of the circuit of FIG. 6 and illustrating the manner of operation of the present invention.

When exposing lamp 7 and reflecting mirrors 8, 31, the drive member 38 and the light shield member 71 are at the rest position, the light beams from light emitting elements 97, 76 in the first and second detecting elements 72, 73, respectively, are intercepted by the light shield member 71. Accordingly, the light receiving elements 96, 78 are in the "off" state as shown at graphs (1) and (2) of FIG. 8, respectively. When a copying operation is to be carried out, print button 100 is operated at time $t_1$, whereby electromagnetic clutch 53 is engaged to drive sprocket wheel 42, so that light shield member 71 moves in the direction of arrow 40. Accordingly, at a time $t_2$, light shield member 71 allows light receiving element 96 to receive light from light emitting element 97 of first detecting element 72. During this time, input 82 of comparison circuit 81 is maintained at low level by resistor 86 as shown at graph (4) of FIG. 8, and therefore output 87 is at high level. Therefore, input 93 of comparison circuit 92 is at high level as shown at graph (5) of FIG. 8, and output 95 is at low level as shown by graph (6) of FIG. 8. Therefore, after time $t_2$, light receiving element 96 applies a low level signal through line 101 to control circuit 99 as shown at graph (3) of FIG. 8. As light shield member 71 moves further in the direction of arrow 40, at a time $t_3$ light receiving element 78 receives light from light emitting element 76 of the second detecting element 73. Thereafter, exposing lamp 7 and reflecting mirrors 8, 31, 9, 10, together with drive member 38, are further moved in the direction of arrow 40, thereby achieving an exposure operation. During such movement, third detecting element 74 at a suitable predetermined time detects light shield member 71 to initiate supply of a copy paper sheet from one of cassettes 17/18.

After the exposure operation, the electromagnetic clutch 53 is disengaged, and electromagnetic clutch 64 is engaged to move the elements in the reverse or return direction. During such return movement, at a time $t_4$ light shield member 71 intercepts light from light emitting element 76 of second detecting element 73, such that this light is not received by a light receiving element 78. Thus, transistor 91 of comparison circuit 81 is rendered conductive for a short period of time by the action of differentiation capacitor 79. Accordingly, capacitor 89 is instantaneously discharged through transistor 91, and then is gradually charged through resistor 88 as shown at graph (5) of FIG. 8. Thus, comparison circuit 92 provides a high level signal at output terminal 95 until a time instant $t_6$ when input 93 reaches the discrimination level l. At time $t_4$ control circuit 99 releases electromagnetic clutch 64. As a result, light shield member 71 and accordingly exposing lamp 7 and reflecting mirrors 8, 31 and the drive member 38, continue movement in the return direction by inertia only and are not positively driven. When these elements operate in the intended manner and return to the rest position by inertia, then at some time $t_5$ between times $t_4$ and $t_6$ the light shield member 71 will intercept light from light emitting element 96 of first detecting element 72 so that such light will not be received by light receiving element 96. Accordingly, line 101 is maintained at high level from the time $t_4$, as indicated by graph (3) in FIG. 8.

Figure 9:
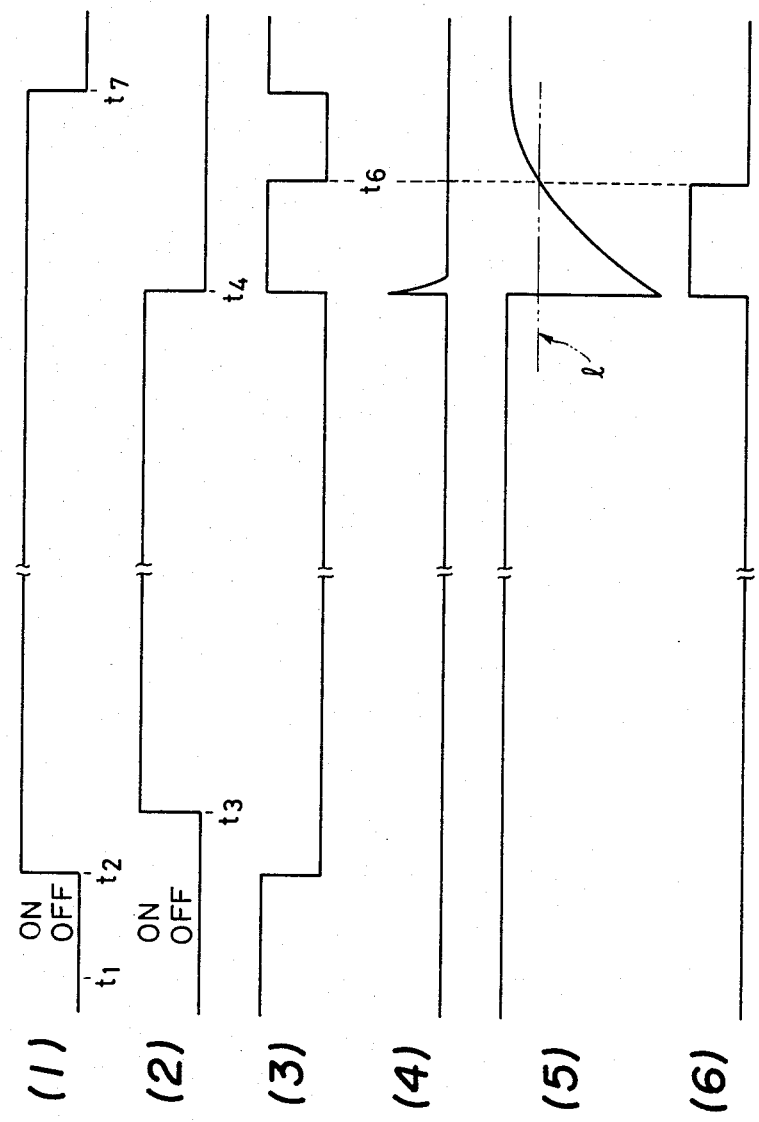

However, if for some reason the elements 71, 7, 8, 31, 38 are not returned to the rest position by inertia after the release of electromagnetic clutch 64, then the device will operate as indicated by the wave graphs in FIG. 9. Thus, FIG. 9 illustrates the operation of the apparatus of the present invention when light shield member 71 does not reach the rest position for some reason during the period between times $t_4$ and $t_6$. In this regard, attention is directed to the fact that this period between times $t_4$ and $t_6$ is the period for which the voltage at input terminal 93 of comparison circuit 92 is lower than the discrimination level l. Graphs (1) through (6) of FIG. 9 correspond to those of FIG. 8 up to and for a period after time $t_4$. At time $t_4$, light receiving element 78 of second detecting element 73 is blocked as shown at graph (2) of FIG. 9, whereby a pulse shown at graph (4) of FIG. 9 is applied to input terminal 82 of comparison circuit 81 by differentiation capacitor 79. Also, a voltage, which increases gradually by the action of time constant circuit 90 as shown at graph (5) of FIG. 9, is applied to input terminal 93 of comparison circuit 92. Control circuit 99, in response to a signal, shown at graph (3) of FIG. 9, of line 101, disengages electromagnetic clutch 64 for a high level period between times $t_4$ and $t_6$. However, when at time $t_6$ light receiving element 96 is not blocked, clutch 64 again is engaged. Therefore, light shield member 71 is further positively moved in the direction opposite to the direction of arrow 40. When line 101 is raised to high level at a time $t_7$, i.e. when light receiving element 78 is blocked, then clutch 64 again is disengaged. Thus, in accordance with the present invention light shield member 71, and thereby elements 7, 8, 31 positively are caused to reach the rest position, with the result that a subsequent copying operation may be satisfactorily initiated.

The above embodiment of the present invention has been described and illustrated with regard to movement of the exposing unit 6. It is to be understood however that the concept of the present invention equally applies to a copying machine of the type wherein the original and the original supporting plate is moved, with the optical system remaining stationary. Furthermore, the concept of the present invention may be broadened such that it applies not only to copying machines, but also printing machines or the like.

As will be apparent from the above discussion, in accordance with the present invention the movable member is positively returned to the rest position by inertia, with the result that the movable member or members are stopped gradually, thereby avoiding shock to the machine. As a result, the copied image will be sharp and clear, and also the components of the machines will not be subjected to loosening. As further will be apparent from the above discussion, the apparatus of the present invention provides that in the event that the movable member is not returned to the rest position by inertia, then such condition will be detected and the drive element again will be initiated to complete such return movement.

Although the present invention has been described and illustrated with respect to preferred features thereof, it is to be understood that various modifications may be made to the specifically described and illustrated structural features without departing from the scope of the present invention.

We claim:

1. An apparatus for regulating the movement of a movable member, said apparatus comprising:
   drive means for moving the movable member in a first direction from a rest position to an operative position and for moving the movable member in a second direction, opposite to said first direction, from said operative position toward said rest position;
   first detecting means for detecting the presence of the movable member at said rest position;
   second detecting means for detecting the presence of the movable member at a location adjacent said rest position but upstream thereof with respect to said second direction; and
   control means, operatively connected to said drive means, said first detecting means and said second detecting means, for operating said drive means to move the movable member in said first direction and then in said second direction, for stopping said drive means upon detection of the movable member, moving in said second direction, at said location by said second detecting means, whereafter the movable member continues movement by inertia in said second direction from said location to said rest position and is detected thereat by said first detecting means, and for, if the movable member is not detected at said rest position by said first detecting means within a predetermined time period after said detection by said second detecting means, again starting said drive means to move the movable member in said second direction until detection thereof by said first detecting means.

2. An apparatus as claimed in claim 1, wherein said drive means comprises a first drive assembly for driving the movable member in said first direction, and a second drive assembly for driving the movable member in said second direction, and said control means is operatively connected to said first and second drive assemblies.

3. An apparatus as claimed in claim 1, wherein the movable member includes a movable portion of a copying machine which is moved in said first direction during exposure of an original to be copied onto a sheet of copy paper, and further comprising third detecting means, positioned downstream of said second detecting means with respect to said first direction and operatively connected to said control means, for detecting the movement of the movable portion for commencing feeding of a copy paper sheet.

4. An apparatus as claimed in claim 1, wherein said first and second detecting means each include a light emitting element and a light receiving element, and further comprising a light shield member mounted for movement with the movable member between respective said light emitting and receiving elements.

5. An apparatus as claimed in claim 1, wherein said control means comprises a first comparison circuit having a first input connected to said second detecting means, a second input supplied with a reference voltage, and an output, a second comparison circuit having a first input, a second input supplied with said reference voltage, and an output connected to said first detecting means, a time constant circuit connected to said output of said first comparison circuit and to said first input of said second comparison circuit, and a control circuit connected to said first detecting means and to said drive means.

* * * * *